UNITED STATES PATENT OFFICE.

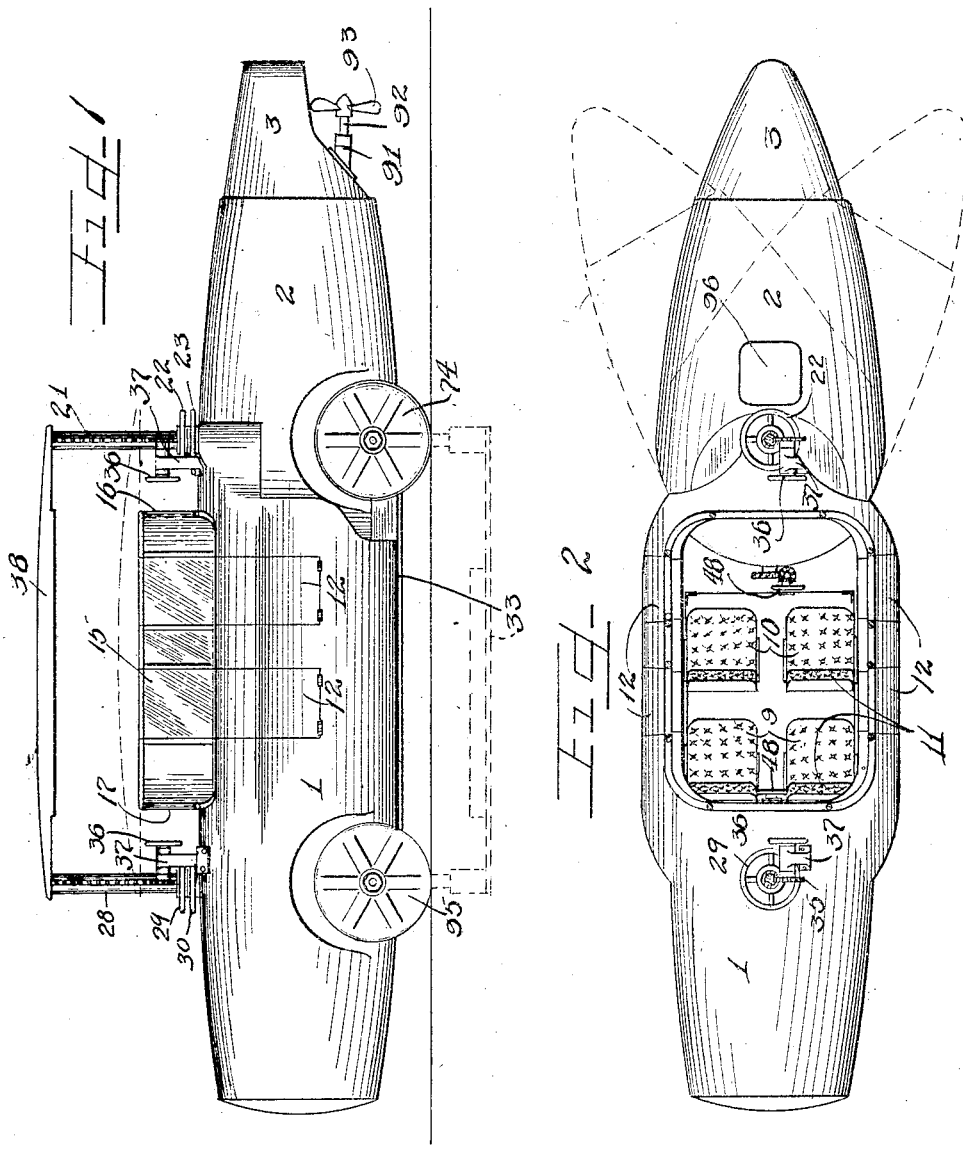

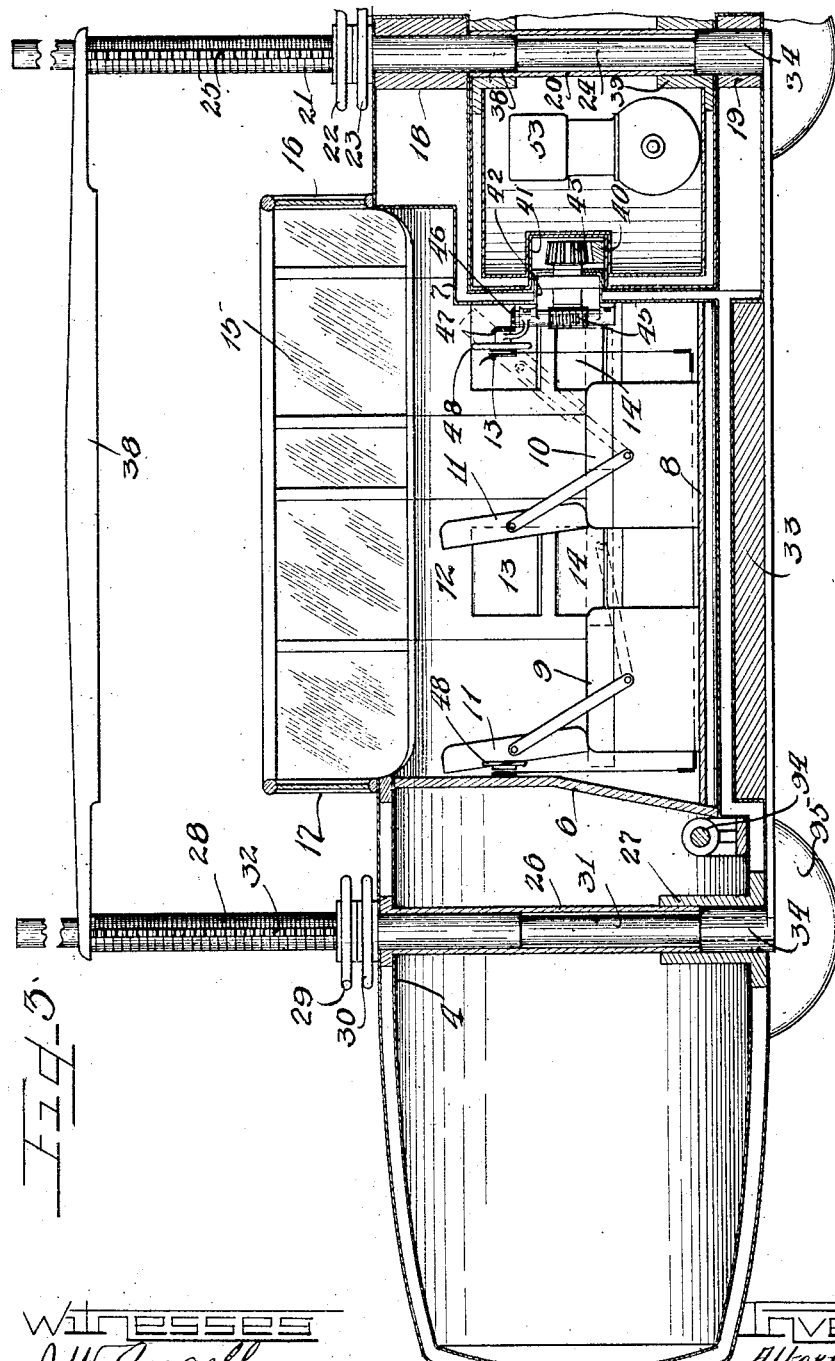

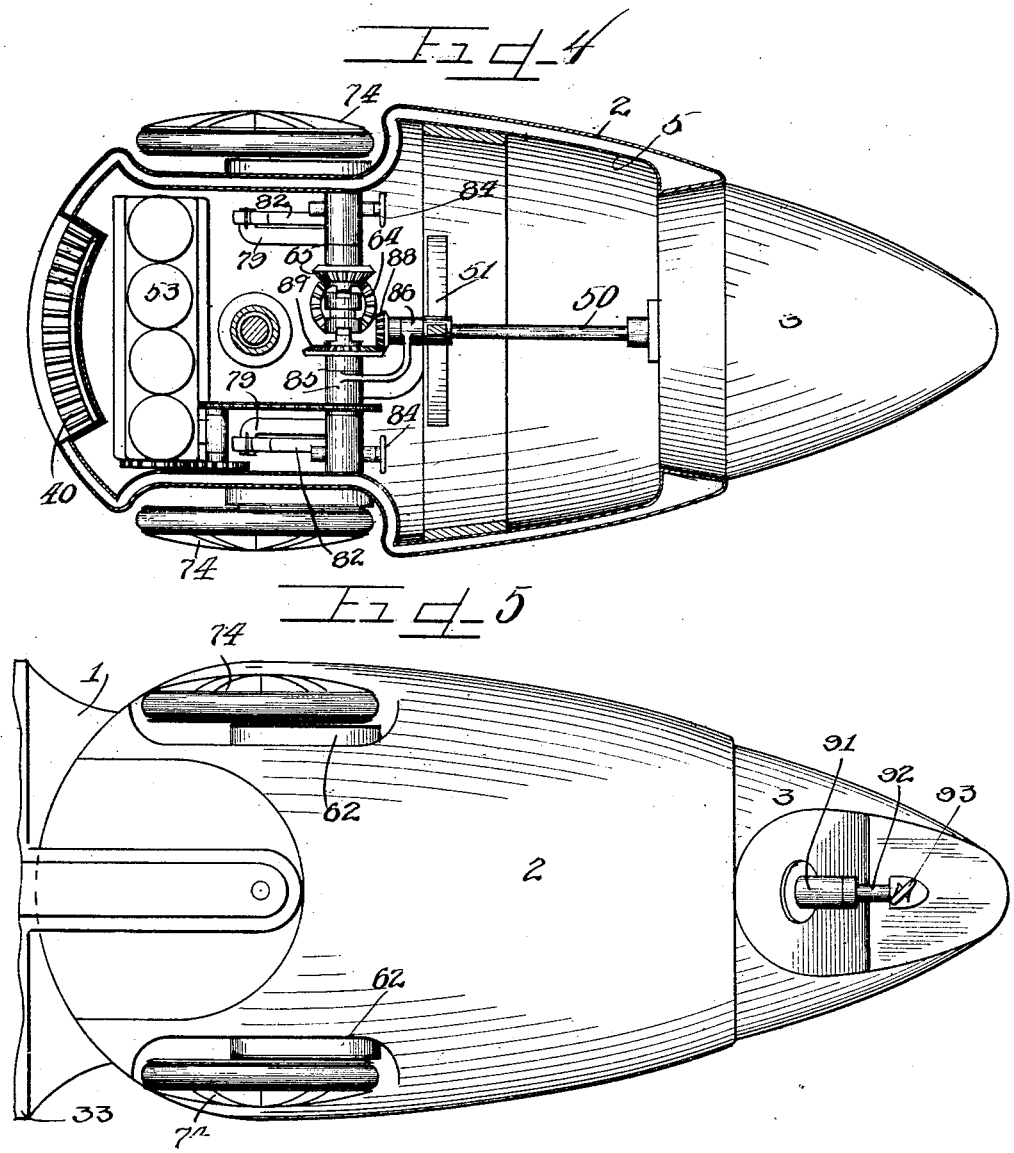

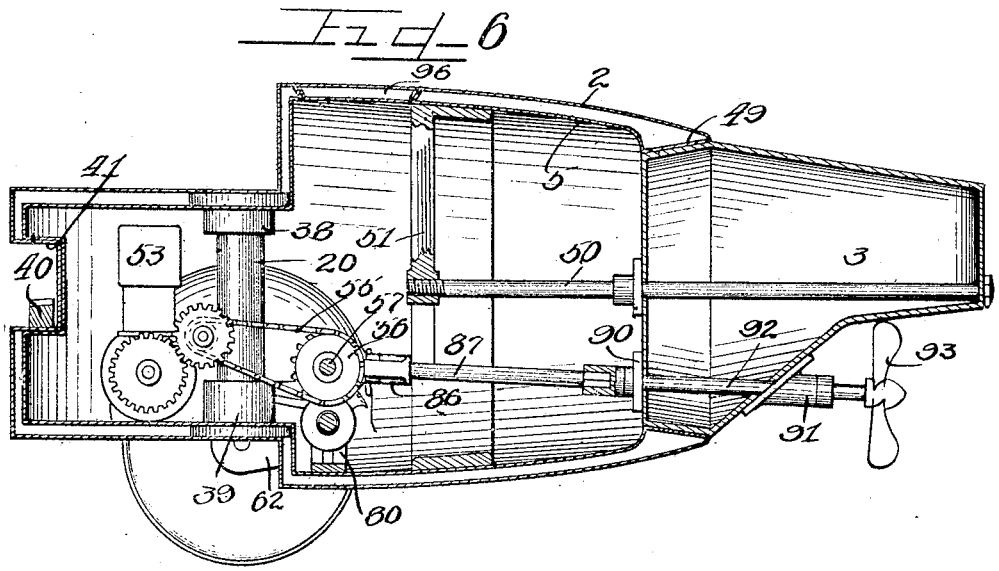
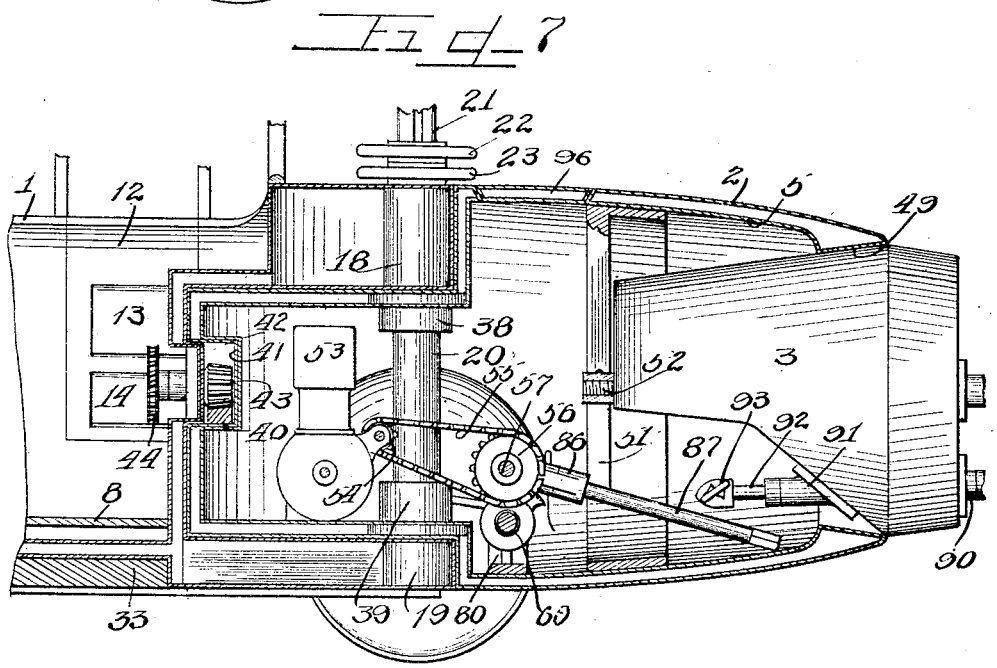

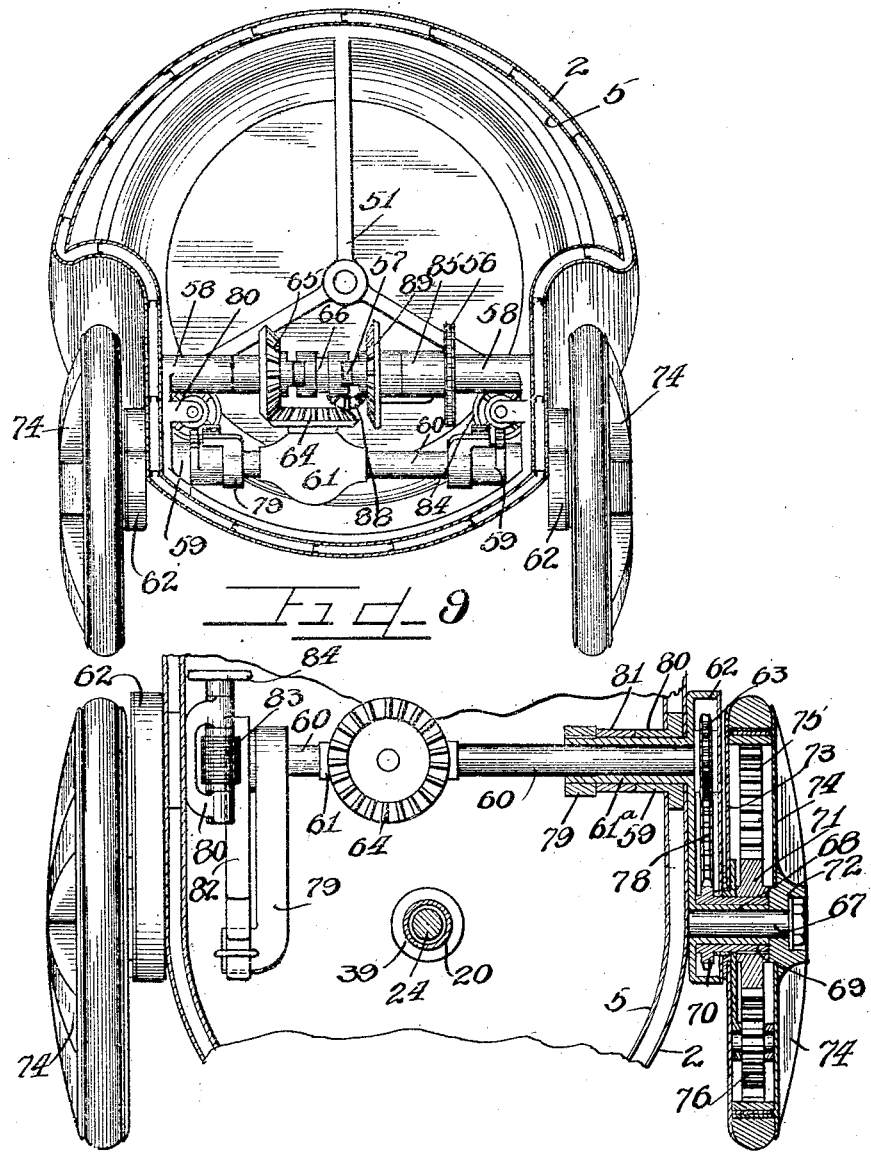

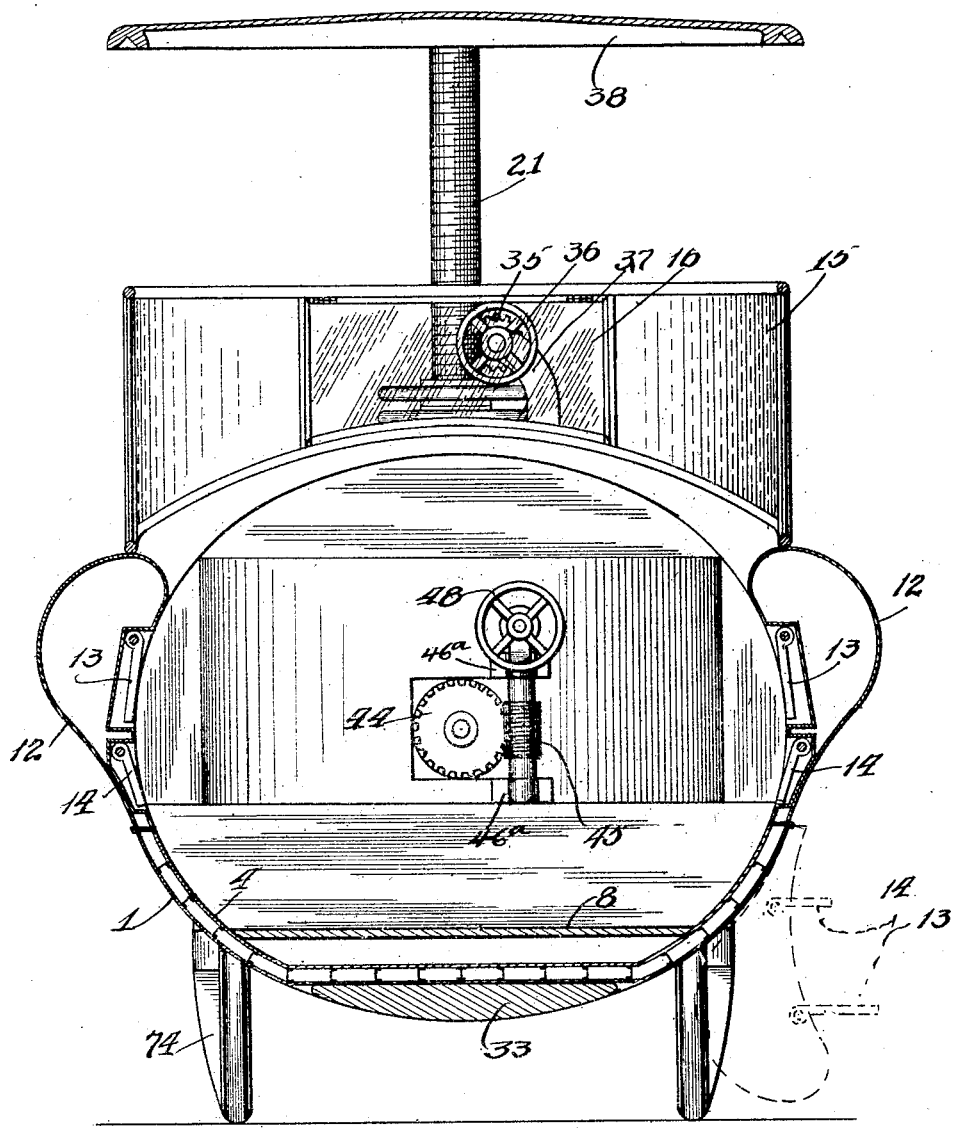

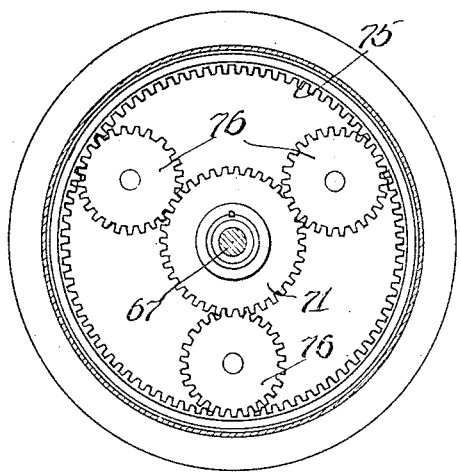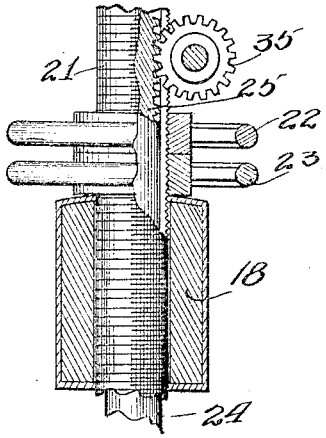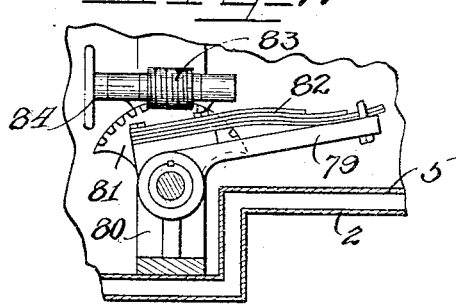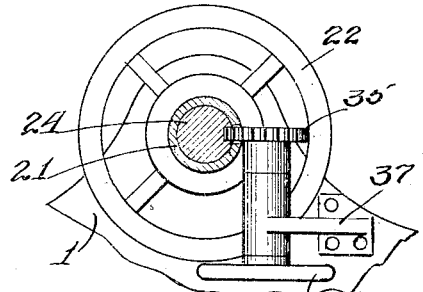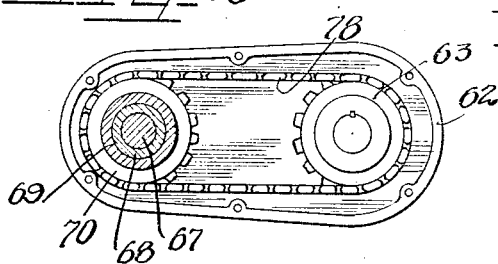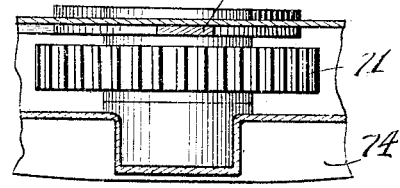

ALBERT E. COOK, OF CHICAGO, ILLINOIS.

AUTO-MARINE VEHICLE.

1,364,545.   Specification of Letters Patent.   Patented Jan. 4, 1921.

Application filed July 20, 1917. Serial No. 181,788.

*To all whom it may concern:*

Be it known that I, ALBERT E. COOK, a citizen of the United States, and a resident of the city of Chicago, in the county of Cook and State of Illinois, have invented certain new and useful Improvements in Auto-Marine Vehicles; and I do hereby declare that the following is a full, clear, and exact description of the same, reference being had to the accompanying drawings, and to the numerals of reference marked thereon, which form a part of this specification.

This invention relates to a combination land vehicle and water craft adapted to negotiate its way either over the land or on the water. My invention contemplates the use of a hull body of sectional construction of which certain sections are adjustable for guidance of the vehicle upon land or water, and with the operation of the vehicle controlled substantially in the same manner, irrespective of whether the vehicle is operated on land or water.

It is an object therefore of this invention to construct a land and water vehicle comprising a hull of sectional construction, with certain of said sections adjustable with respect to one another, and with land wheels on the exterior of the hull for operation of the vehicle on land, and with a propeller means for operation of the vehicle in the water, and permitting operation of the vehicle either on land or water without change in the parts or mechanisms if so desired.

It is also an object of this invention to construct a land and water vehicle embracing a hull equipped with wheels for operation of the vehicle on land, and with means for driving the vehicle through the water, and with a power plant mounted within said hull and adapted to transmit a drive either to the land wheels, or water propelling means for the vehicle.

It is also an object of this invention to construct a land and water vehicle with means for operating the vehicle over the land, and other mechanism for propelling the vehicle through the water, and yet with the land propelling means so constructed as to adapt the same for use in operating the vehicle through the water without use of said propelling mechanism, if so desired.

It is also an object of this invention to construct a land and water vehicle embracing a hull-like sectional body with certain sections thereof adjustable for guidance of the vehicle, and with the power plant and driving mechanism mounted in the adjustable section of the body and controlled from the main sections of the body for operation of the vehicle either over land or water.

It is furthermore an important object of this invention to construct a land and water vehicle comprising a sectional hull body with a power plant, and driving means mounted thereon for the purpose of propelling the craft either over land or water by the same or different driving means provided, together with means for totally inclosing the vehicle for protection from the elements when desired, and for increasing the stability thereof when used upon the water.

Other and further important objects of my invention will be evident from the disclosure in the drawings and specification.

The invention (in a preferred form) is illustrated in the drawings and hereinafter more fully described.

On the drawings:

Figure 1 is a side elevation of a land vehicle and water craft embodying my invention, shown ready for use either upon land or water.

Fig. 2 is a top plan view thereof with the adjustable shelter top omitted, and with the operation of the movable body section shown in dotted lines.

Fig. 3 is an enlarged fragmentary central vertical section taken through the main body or hull section of the vehicle.

Fig. 4 is a fragmentary horizontal section taken through the adjustable body section, showing the interior thereof in plan view, with parts omitted.

Fig. 5 is a bottom plan view of the mechanism shown in Fig. 4.

Fig. 6 is a longitudinal vertical section taken through the adjustable hull section, shown in Figs. 4 and 5, with parts omitted and parts shown in elevation.

Fig. 7 is a similar view with a detachable section of the adjustable body section shown inverted thereinto for decreasing the overall length of the vehicle.

Fig. 8 is a transverse vertical section taken through the rear end of the adjustable body section, looking forwardly thereof, with parts omitted and parts shown in elevation.

Fig. 9 is a fragmentary sectional plan view of the mechanism shown in Fig. 8, with parts omitted and parts shown in elevation.

Fig. 10 is a central transverse vertical section taken through the vehicle, with parts in elevation and with parts omitted.

Fig. 11 is an interior view of one of the land vehicle wheels, showing the internal drive therefor.

Fig. 12 is a fragmentary detail section, with parts in elevation, through one of the shelter top supporting standards showing the operating mechanisms therefor.

Fig. 13 is a fragmentary plan view of the mechanism shown in Fig. 12.

Fig. 14 is a detail view illustrating the adjustable resilient connection of a land vehicle wheel supporting casing with the drive shaft on the interior of the hull section.

Fig. 15 is a detail view illustrating the chain connection between a land vehicle wheel and the drive shaft therefor.

Fig. 16 is a fragmentary detail view of the hub of a land driving wheel, showing the central gear of the internal gear drive.

As shown on the drawings:

The reference numeral 1, indicates as a whole a main body section, and the reference numeral 2, a pivoted or adjustable buoyant body section, having a detachable and revertible telescoping section 3, mounted in the end thereof. The entire body or hull is substantially of stream-line form, and the main body section 1, is provided with an interior wall or shell 4, which is spaced from the outer shell of the body and said inner and outer shells or walls of said body are of water tight construction. Similarly, the adjustable body section 2, is provided with an inner shell or wall 5, and both the inner and outer shells of said adjustable section are likewise of water-tight construction.

As shown in Fig. 3, a rear bulkhead 6, is provided on the interior of the main body section, and a forward bulkhead 7, with a floor 8, extending along the central portion of the body section. Mounted within the central compartment which is inclosed by the side walls of the main section 1, the respective bulkheads 6 and 7, and the floor 8, are shiftable seats 19 and 10, having hingedly adjustable backs 11, which may be swung down, as shown in dotted lines, to the level of the seats, thereby affording sleeping quarters within the vehicle. As shown in Figs. 1, 3 and 10, door sections 12, are hingedly mounted in the side walls of the main body section 1, to seal therewith when in closed position, and when swung downwardly, as shown in dotted lines in Fig. 10, afford a means of entrance into the body by steps 13 and 14, respectively, which are pivoted in the door sections, and automatically swing outwardly for use when the door is opened. Built around the upper portion of the central compartment of the main body section is a glass wall inclosure 15, provided with hinged sections 16 and 17, at the forward and rear ends thereof, respectively.

Mounted in the forward end of the main body section 1, are upper and lower bearings 18 and 19, between which a tubular bearing or sleeve 20, is registered and rigidly secured. Slidably mounted through the upper bearing 18, and upper portion of the tubular bearing 20, is a tubular upright standard 21, having threads formed on the exterior thereof, and engaged on said standard are a pair of hand wheels 22 and 23, respectively, which serve to adjust and maintain said upright in different elevated positions. Slidable within said tubular upright 21, is a shaft or rod 24, having a series of teeth forming a rack 25, formed longitudinally near the upper portion thereof, which are visible through a longitudinal slot in said tubular upright 21, as shown in Fig. 3, and said shaft or rod 24, extends slidably through the lower bearing 19. Secured in the rear compartment of the main body section 1, is a fixed upright tubular bearing 26, secured to a lower bearing 27, and, slidably mounted therein is a slotted, tubular, threaded upright 28, actuatable by hand wheels 29 and 30, and slidable within said tubular upright is a shaft or rod 31, which extends into the lower bearing 27. Said shaft or rod 31, is provided with a series of teeth forming a rack 32, on the upper portion thereof, which are accessible through the slot in said threaded upright 28. Mounted in a recess formed in the underside of the main body section 1, is a weighted horizontal keel 33, provided with extensions 34, on each end, which are secured to the respective slide rods 24 and 31, whereby the keel may be lowered out of its recess to lower the center of gravity of the craft when used on water.

For the purpose of actuating the slide rods 24 and 31, two pinions 35, are provided as shown in Figs. 2, 12 and 13, one meshing with each of said respective racks 25 and 32, through the longitudinal slots in the tubular uprights 21 and 28, and each pinion 35 is actuable by a vertically disposed hand wheel 36, secured with said pinion upon a shaft journaled in a bracket 37, mounted on the upper portion of the body of the craft. A shelter roof or top is mounted on the upper end of the tubular uprights 21 and 28 and is adapted to be raised and lowered thereby, and, when lowered, seals around the upper portion of the glass wall structure 15.

The adjustable section 2, of the hull of the craft, is connected to the main section 1, in the following manner. Referring to Figs. 2, 3 and 7, it will be seen that the forwardly extending portions of the main body section 1, in which the bearings 18 and 19, are mounted, overlap the rearwardly extending tail portion of the adjustable section 2, and interior bearings 38 and 39, respectively, are provided on said adjustable section, as shown in Figs. 6 and 7, which fit around the vertical tubular pivot shaft 20. As shown in Figs. 7 and 4, an arc-shaped rack bar 40, is secured upon the tail portion of the adjustable section 2, in a curved recess 41, provided therefor, and journaled longitudinally through the front wall of a curved projecting tongue 42, which interfits said recess 41, is a shaft having a bevel pinion 43, meshing with said curved rack bar. On the inner end of the shaft on which the pinion 43, is secured, is a worm gear 44, and a worm shaft 45, is engaged therewith, mounted vertically in bearing brackets 46ª. Secured upon the upper end of the worm shaft 45 is a bevel pinion 46, meshing with a bevel pinion 47, which is operated by a hand wheel 48, mounted conveniently within the central compartment of the main body section 1. Another hand wheel also designated by the reference numeral 48, is mounted at the other end of the compartment and is connected by suitable means for simultaneous movement therewith so that the vehicle can be steered by either one thereof. The forward end of the adjustable section 2, is provided with an inwardly tapered aperture or opening 49, into which the invertible section 3, is sealingly fitted, either in the position shown in Fig. 6, or in the position shown in Fig. 7. When mounted in the position shown in Fig. 6, said detachable section 3, is held secured to the adjustable section 2, by a long rod or shaft 50, secured through the section 3, and threaded into a spider bracket 51. mounted within the adjustable section 2. When in the position shown in Fig. 7, so as to be disposed almost entirely within the section 2, said section 3, is held attached by means of a short shaft section 52, threaded into the spider bracket 51.

Mounted within the adjustable section 2, is the power plant for the craft, which consists of a vertical transversely mounted four-cylinder hydro-carbon motor 53, although, of course, any other suitable engine or motor may be used for the purpose. A sprocket wheel 54, is mounted on the engine and driven thereby, and trained about said sprocket wheel is a driving chain 55, which leads to and is trained around a sprocket wheel 56, secured upon a horizontal transverse shaft 57, which is mounted in bearings 58, secured on the side walls of the body section 2. Journaled in bearings 59, attached to the side walls of the section 2, beneath said shaft 57, are two differential axles 60, the inner ends of which lead into a differential casing 61, containing a conventional form of differential. The outer ends of the differential axles 60 extend through tubular bearing extensions 61ª, which form a part of casings or arms 62, and within said casing or arms, said differential axles 60 are provided with sprocket wheels 63.

The differential is adapted to be driven by a bevel gear 64, journaled on the exterior of the differential casing 61, and meshing with a bevel gear 65, journaled upon the shaft 57, and adapted to be caused to rotate therewith by engagement with a jaw clutch 66, feathered upon said shaft.

Secured in the casing arms 62, are studs or axle shafts 67, as shown in Fig. 9, which extend through tubular axle extensions 68 of the casings 62. Journaled on each tubular axle extension 68, is a sleeve 69, with a sprocket wheel 70, formed or secured thereon, and keyed or otherwise rigidly secured to the other end of said sleeve 69, is a central hub pinion 71. Journaled upon the outer end of each of the stud axle shafts 67, is the outer hub portion 72, of a built-up wheel comprising an inner plate 73, and an outer plate 74, said wheel having on its interior an inner peripheral or annular gear 75.

As shown in Fig. 11, three equidistantly spaced planetary gears 76, are journaled between the inner and outer plates 73—74, of the wheel, meshing with the central hub gear 71, and with the annular gear 75, of the wheel, thereby affording an internal drive for the wheel. Said planetary gears 76, are all journaled about the stationary spider 77, which is rigidly secured to or integral with the casing member 62, and around which the wheel is adapted to rotate.

Formed or secured upon the outer plate 74, of each of the wheels, are fins or vanes which serve to afford rigidity to the wheel construction, and may, as hereinafter pointed out, assist in driving the vehicle through the water. A driving chain 78, is trained about the wheel sprocket 70, and about the sprocket 63, on the axle section of the differential driving axle. Keyed upon each of the inner inwardly extending hub extensions or sleeves 61ª, of the chain casing arms 62, are rigid rearwardly directed arms 79, as shown in Fig. 14, and adjacent to each of said arms is a standard or bearing bracket 80, which affords a support for the differential drive shaft or axle. Journaled upon said sleeve or hub extension 61ª, is a worm gear segment 81, having a heavy leaf spring 82, attached thereto, which bears upon the arm 79, and is shackled thereto, and acts to resist upward movement thereof.

A worm shaft 83, meshing with said worm wheel segment 81, is journaled on an extension of the bracket or standard support 80, and is actuable by a hand wheel 84. Thus, adjustment of the worm wheel segment 81, from the manually actuable worm 83, serves to change the thrust of the leaf spring 82, upon the arm 79. The arm 79, being rigidly connected to the casing arm 62, tends to swing with the wheel on the exterior of the body section mounted at the end of said casing arm, as the vehicle moves over the ground, and thus a spring support for the body upon each of the driving wheels is obtained through each of the said leaf springs 82, provided.

Journaled upon the shaft 57, is a bracket 85, as clearly shown in Fig. 4, an arm extension of which affords a bearing 86, through which is journaled a shaft section 87. Secured upon the end of said shaft section 87, adjacent the bearing 86, is a small bevel pinion 88, which meshes with a bevel gear 89, journaled upon the driving shaft 57, and adapted to be engaged by the slidable jaw clutch 66. As clearly shown in Fig. 6, the detachable end body section 3, is provided with stuffing box bearings 90 and 91, through which a propeller shaft 92, is journaled, having a propeller wheel 93, secured upon the outer end thereof. The inner end of said shaft 92, is provided with a squared recess, and the end of said shaft 87, is provided with a squared end to interfit therewith, as clearly shown in Fig. 6, whereby driving connection is effected between said shaft sections 87 and 92. As shown in Fig. 3, a rear axle 94, is mounted in the rear compartment of the main body section 1, and pivotally mounted upon the outer ends thereof in the same manner as the forward driving wheels described, but without a power drive connection thereto, are wheels 95, and the same resilient pivoted spring support for the body upon said axle is used, though not shown, as is illustrated in Fig. 14, for the front axle.

A watertight door 96, is provided in the upper wall of the movable body section 2, to give access into the interior thereof.

The operation is as follows:

The vehicle or craft as shown in Figs. 1 and 2, is adapted for operation over either land or water, but preferably over the water inasmuch as the detachable section 3, is extended from the adjustable section 2, to expose the propeller 93, and also afford a lengthened body to secure an increased flotation effect. If the drive is to be imparted to the wheels for movement of the vehicle over the ground, the clutch 66, shown in Fig. 8, is shifted into engagement with the bevel gear 65, so that the same drives the bevel gear 64, connected to the differential mechanism 61, thereby driving the respective wheels on the end of the differential axles 60 through the chains 78. Said wheels are pivotally mounted upon the end of the chain casing arms 62, so as to have the pivotal movement about the differential axle mechanism 60, and this movement is resisted by the springs 82, shackled to, and bearing upon the arms 79, which are rigidly connected to said chain casing arms. The shaft 57, on which the jaw clutch element 66, is feathered, of course, receives its drive from the engine or motor 53, through the sprocket chain connection 55. Inasmuch as the engine 53, or power plant is carried within the adjustable section 2, as well as all driving connections therefrom to the driving wheels, all of said mechanisms are adjustable as a whole with said section. The movable section 2, is laterally pivotally adjustable about the central pivot bearing 20, within the main body section 1. Adjustments are effected by either of the steering hand wheels 48, mounted within the driving compartment of the main body section, to actuate the bevel pinion 43, which meshes with the curved rack 40, secured upon the tail portion of the movable body section. The possible adjustment of said movable body section 2, is shown in dotted lines in Fig. 2, and this adjustment may be effected for steering the craft either on land or water. Generally, when used upon the land, the detachable body section 3 is inverted and connected into the movable body section 2, in the manner shown in Fig. 7, to reduce the over-all length of the vehicle, and as well conceal the propeller wheel within the body.

Any of the doors 12, provided at each side of the main body section 1, may be swung downwardly, as shown in dotted lines in Fig. 10, to permit entrance or exit from the vehicle, and when so adjusted, the pivoted steps 13 and 14, therein swing outwardly automatically into position for use. When said doors are closed they seal tightly with the body forming a water proof connection therewith.

If it is desired to use the craft in water, the invertible section 3, is mounted in the position shown in Figs. 1 and 2, and then, if desired, the shelter roof or top 38, may be lowered by turning the hand wheels 22 and 23, and 29 and 30 until said top seals against the upper portion of the glass frame work 15, as shown in dotted lines in Fig. 1. Furthermore, after the craft has been launched into the water, the hand wheels 36, may be operated to lower the keel 33, downwardly into the dotted line position shown in Fig. 1, thereby lowering the center of gravity of the craft and increasing the stability thereof. In order to impart a drive to the propeller wheel 93, the clutch 66, shown in Fig. 8, is moved into engagement with the bevel gear 89, and said bevel gear 89, drives the bevel pinion 88, which, in turn, drives the shaft section 87, coupled to the propeller shaft 92.

The craft may travel in either direction, the propeller 93, either acting as a tractor screw to move the craft in the same direction as normally driven upon land, or by reversal of the blades of the propeller the craft may be operated in the opposite direction with the propeller wheel then operating at the stern of the craft, and the adjustable body section as a tail for steering the craft.

Generally, when the craft is used in the water, the driving wheels of the movable section 2, are elevated, and this is accomplished by rotating the hand wheels 84, which operate the worms 83, to turn the worm gear segments 81, thereby elevating the springs 82, and lifting the arms 79, shackled thereto, which, of course, are rigidly connected with the pivotal casing arms 62, on which the driving wheels are mounted. When the driving wheels have been elevated so as to be only partially submerged they may be driven instead of the propeller to move the craft through the water.

Of course, it is to be understood that at all points in the body of the vehicle where any of the mechanisms pass therethrough, stuffing boxes may be provided around said connections to afford a water tight joint.

I am aware that various details of construction may be varied through a wide range without departing from the principles of this invention, and I therefore do not purpose limiting the patent granted otherwise than necessitated by the prior art.

I claim as my invention:

1. A land and water vehicle comprising a sectional body, power driving means mounted therein, a keel member adapted to be lowered from the body to lower the center of gravity of the vehicle in the water, and adjustable driving wheels adapted to be elevated when the vehicle is in the water.

2. A land and water vehicle of the class described comprising a main body section, an adjustable body section pivoted thereto, driving means mounted in said pivoted body section and movable therewith to drive and steer the vehicle, an adjustable top for said vehicle adapted to be sealed over the upper portion thereof, and keel mechanism adapted to be lowered from beneath the vehicle to increase the stability thereof in water.

3. In a land and water vehicle of the class described, a main body section, an adjustable body section pivoted thereto for transverse movement to steer the vehicle both on land and in the water, steering connections for adjusting said pivoted section for operation of the vehicle in either direction, power driving means mounted within said pivoted section and power driving wheels and water propelling means associated with said pivoted section, and adjustable therewith in all adjustments of said section.

4. In a land and water craft of the class described, a sectional body comprising sections movable with respect to one another to steer the craft on land or water, means for driving the craft on land, means for driving the craft upon the water, and means changing the center of gravity of the craft for use upon the water.

5. In a land and water vehicle of the class described, a main section, an adjustable section pivoted therein to steer the vehicle on land and water, land wheels mounted on said main section and upon said adjustable section to support the vehicle, means mounted within said main section for adjusting said adjustable section, power driving means situated in said adjustable section, and means for propelling the vehicle on the water.

6. In a land and water vehicle of the class described, a hull-like body, means driving the same over land and water, an adjustable top adapted to be lowered into sealing relation with the upper portion of said body, and mechanism for moving one end of the body out of alinement with the longitudinal axis of the vehicle to steer the same.

7. In a land and water vehicle of the class described, a main body section, an adjustable section pivoted thereto to steer the vehicle on land and water, a detachable telescoping section associated with said adjustable section to vary the length and displacement of said vehicle, and power driving means mounted in said adjustable section to operate the vehicle over land and water.

8. A land and water vehicle comprising a sectional body, power driving means mounted therein, a keel member adapted to be lowered from the body to lower the center of gravity of the vehicle in the water, adjustable driving wheels adapted to be elevated when the vehicle is in the water, and connections from said power means to said driving wheels.

9. A land and water vehicle of the class described comprising a main body section, a pivoted body section connected thereto, a power driving means mounted in the pivoted body section and movable therewith, and land and water wheels operated by said means to drive the vehicle and steer the same.

10. A land and water vehicle of the class described comprising a main body section, an adjustable body section pivoted thereto, driving means mounted in said pivoted body section and movable therewith to drive and steer the vehicle, an adjustable top for said vehicle adapted to be sealed over the upper portion thereof, keel mechanism adapted to be lowered from beneath the vehicle to increase the stability thereof in water, and telescoping operating devices for said adjustable top and keel mechanism.

11. In a land and water vehicle of the class described, a main body section, an adjustable body section pivoted thereto for transverse movement to steer the vehicle both on land and in the water, steering connections for adjusting said pivoted section for operation of the vehicle, power driving means mounted within said pivoted section, power driving wheels and water propelling means associated with said pivoted section adjustable therewith, and means for changing the center of gravity of the vehicle.

12. A land and water vehicle comprising a main section, a power section adjustably connected therewith, and a third section adapted to be telescoped into said power section for varying the length of the vehicle.

13. A land and water vehicle comprising a main section, a power section pivotally connected therewith, a reversible section in said power section, driving means in said power section, and propelling means on said power section and on said reversible section adapted to be independently operated by said driving means for propelling the vehicle.

14. In a device of the class described a body, driving means therein, a reversible section telescoped into said body, and a propeller mechanism supported thereby adapted in one position of the reversible section to be exposed and connected with the driving means, and in the reversed position of said reversible section to be disconnected from the driving means and concealed.

In testimony whereof I have hereunto subscribed my name in the presence of two subscribing witnesses.

ALBERT E. COOK.

Witnesses:
CHARLES W. HILLS,
EARL M. HARDINE.